(12) United States Patent
Kim et al.

(10) Patent No.: US 10,455,227 B2
(45) Date of Patent: Oct. 22, 2019

(54) IMAGE SENSOR WITH TEST CIRCUIT

(71) Applicant: Samsung Electronics Co., Ltd., Suwon-si, Gyeonggi-do (KR)

(72) Inventors: Yun-Hong Kim, Hwaseong-si (KR); Hyeok-Jong Lee, Yongin-si (KR); Hee-Sung Chae, Seoul (KR)

(73) Assignee: Samsung Electronics Co., Ltd. (KR)

( * ) Notice: Subject to any disclaimer, the term of this patent is extended or adjusted under 35 U.S.C. 154(b) by 120 days.

(21) Appl. No.: 15/834,296

(22) Filed: Dec. 7, 2017

(65) Prior Publication Data
US 2018/0324416 A1 Nov. 8, 2018

(30) Foreign Application Priority Data
May 8, 2017 (KR) .......................... 10-2017-0057372

(51) Int. Cl.
| | |
|---|---|
| *H04N 17/00* | (2006.01) |
| *H04N 5/3745* | (2011.01) |
| *H04N 5/357* | (2011.01) |
| *H04N 5/343* | (2011.01) |
| *H04N 5/378* | (2011.01) |

(52) U.S. Cl.
CPC .......... *H04N 17/002* (2013.01); *H04N 5/343* (2013.01); *H04N 5/3575* (2013.01); *H04N 5/378* (2013.01); *H04N 5/37455* (2013.01)

(58) Field of Classification Search
CPC .... H04N 17/002; H04N 5/343; H04N 5/3575; H04N 5/37455; H04N 5/378
See application file for complete search history.

(56) References Cited

U.S. PATENT DOCUMENTS

| | | | |
|---|---|---|---|
| 6,522,355 B1* | 2/2003 | Hynecek ................ | H04N 5/361 348/243 |
| 7,721,169 B2 | 5/2010 | Yokomichi et al. | |
| 7,954,042 B2 | 5/2011 | Boehl et al. | |
| 8,054,354 B2* | 11/2011 | Taura ...................... | H04N 5/335 348/187 |
| 8,547,461 B2* | 10/2013 | Jung ..................... | H04N 5/3575 341/155 |
| 8,736,684 B1 | 5/2014 | Johansson et al. | |
| 8,822,898 B2 | 9/2014 | Yaghmai et al. | |
| 9,204,072 B2 | 12/2015 | Hiyama et al. | |
| 9,312,028 B2 | 4/2016 | Corbani et al. | |

(Continued)

FOREIGN PATENT DOCUMENTS

KR 10-2001-0074847 8/2001

*Primary Examiner* — Amy R Hsu
(74) *Attorney, Agent, or Firm* — Myers Bigel, P.A.

(57) ABSTRACT

An image sensor includes a pixel array including a plurality of pixels, an analog-to-digital converter having a first counter for converting an analog signal into a digital signal, and an output buffer having a first memory. A first counter test result value generated as a test result for the first counter is stored in the first memory in a test mode. The output buffer outputs the first counter test result value from the first memory to an outside of the output buffer in response to a first selection signal. The output buffer further includes a reset logic circuit for resetting the first memory depending on whether the first counter test result value is output or not. The plurality of pixels generate the analog signal in response to incident light.

20 Claims, 14 Drawing Sheets

(56) References Cited

U.S. PATENT DOCUMENTS

| | | | |
|---|---|---|---|
| 2002/0074481 A1* | 6/2002 | McGrath | H04N 5/3765 250/208.1 |
| 2010/0194956 A1* | 8/2010 | Yuan | H04N 5/35527 348/308 |
| 2012/0039548 A1* | 2/2012 | Wang | H03M 1/1009 382/312 |
| 2016/0028980 A1* | 1/2016 | Kameyama | H04N 5/378 348/294 |

* cited by examiner

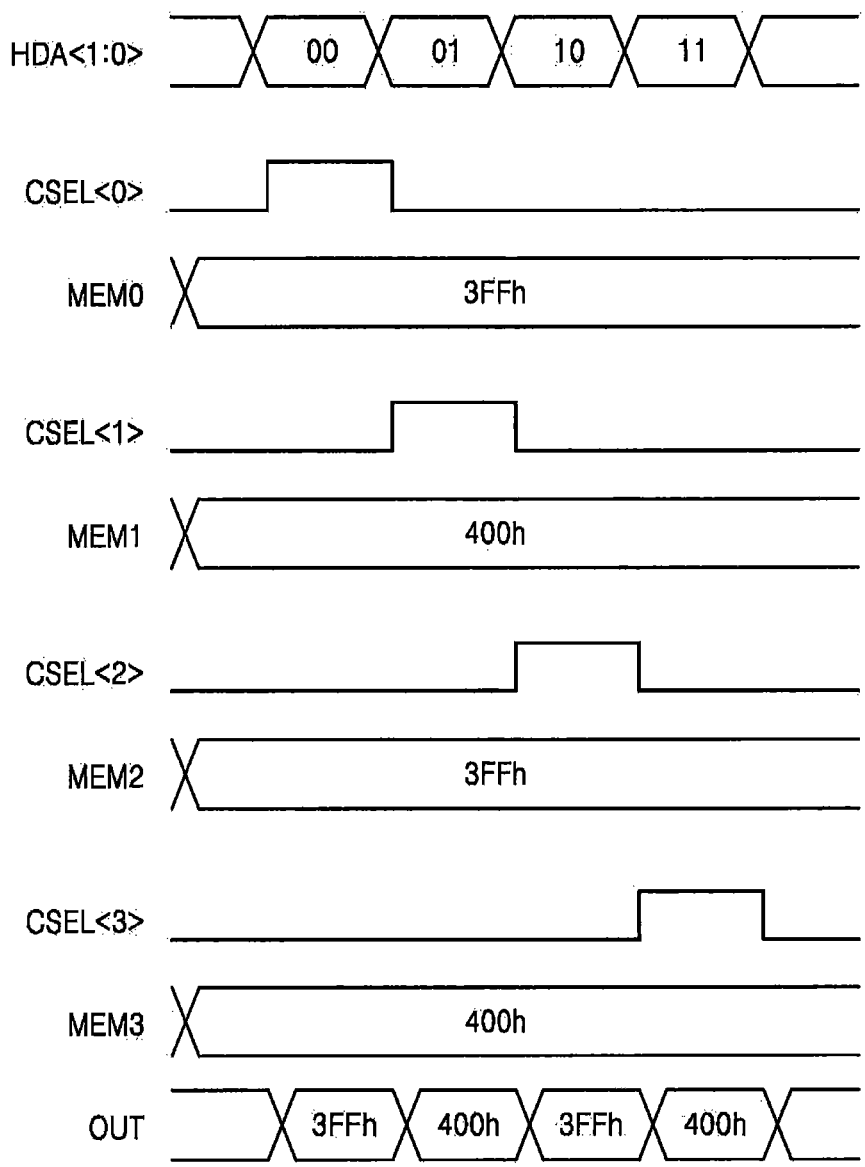

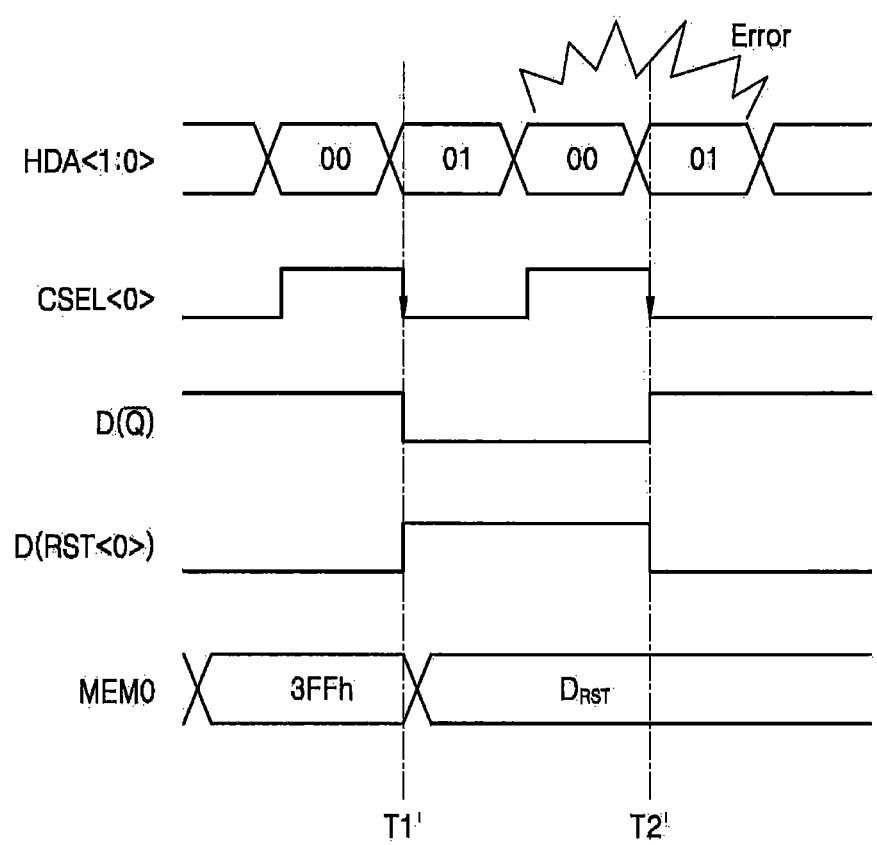

IMAGE SENSOR WITH TEST CIRCUIT

CROSS-REFERENCE TO RELATED APPLICATION

This application claims the benefit of Korean Patent Application No. 10-2017-0057372, filed on May 8, 2017, in the Korean Intellectual Property Office, the disclosure of which is incorporated herein in its entirety by reference.

BACKGROUND

The inventive concepts provided herein relate to an image sensor, and more particularly, to an image sensor having a test circuit for controlling a test operation for a counter used for analog-to-digital conversion.

An image sensor includes an analog-to-digital converter (ADC) for converting an image signal detected as an analog signal into a digital signal. A pixel array of the image sensor includes a plurality of pixels arranged in a 2D matrix, and each of the pixels outputs an image signal from light energy. Each of the pixels integrates a light charge corresponding to the amount of light incident through a photodiode and outputs a pixel signal of an analog signal according to the integrated light charge. The pixel signal is converted into a digital signal by the ADC.

The ADC includes a comparator for comparing an image signal corresponding to each column of the pixel array with a ramp signal and a counter for performing a counting operation according to the comparison result of the comparator to generate a counting result value or a counting code. The counting code of the counter is output as a pixel signal of the digital signal in response to a column selection signal of a column decoder, and is finally output as image data to an outside of the output buffer. In order to realize clear image data, it is important to detect errors in the column decoder, the counter, and a timing controller.

SUMMARY

The inventive concepts provided herein provide an image sensor capable of detecting errors in a counter, a column decoder, and a timing controller when performing a test on an image sensor.

According to an aspect of the inventive concepts provided herein, there is provided an image sensor including a pixel array including a plurality of pixels, an analog-to-digital converter having a first counter for converting the analog signal into a digital signal, and an output buffer having a first memory. A first counter test result value generated as a test result for the first counter is stored in the first memory in a test mode. The output buffer outputs the first counter test result value from the first memory to the outside of the output buffer in response to a first selection signal. The output buffer further includes a reset logic circuit for resetting the first memory depending on whether the first counter test result value is output or not. The plurality of pixels generate an analog signal in response to incident light.

According to another aspect of the inventive concepts provided herein, there is provided an image sensor including a pixel array including a plurality of pixels, an analog-to-digital converter configured to use at least one counter to convert an analog signal generated from the pixels into a digital signal, an output buffer configured to correspond to each of a plurality of columns connected to the pixel array, and a test circuit configured to control a test operation for the counter. The output buffer receives a column selection signal and outputs a counter test result stored in a column memory corresponding to the column selection signal in response to the column selection signal, and then resets the column memory corresponding to the column selection signal. The output buffer has a plurality of column memories configured to store counter test result values using the counter.

BRIEF DESCRIPTION OF THE DRAWINGS

Example embodiments of the inventive concepts provided herein will be more clearly understood from the following detailed description taken in conjunction with the accompanying drawings in which:

FIGS. 6A to 6C are timing diagrams for explaining a method of detecting an error in a column decoder using the reset logic circuit of FIG. 5;

FIG. 8B is a timing diagram for explaining an operation of the reset logic circuit of FIG. 7;

DETAILED DESCRIPTION

Hereinafter, example embodiments of the inventive concepts provided herein will be described in detail with reference to the accompanying drawings.

Figure 1:
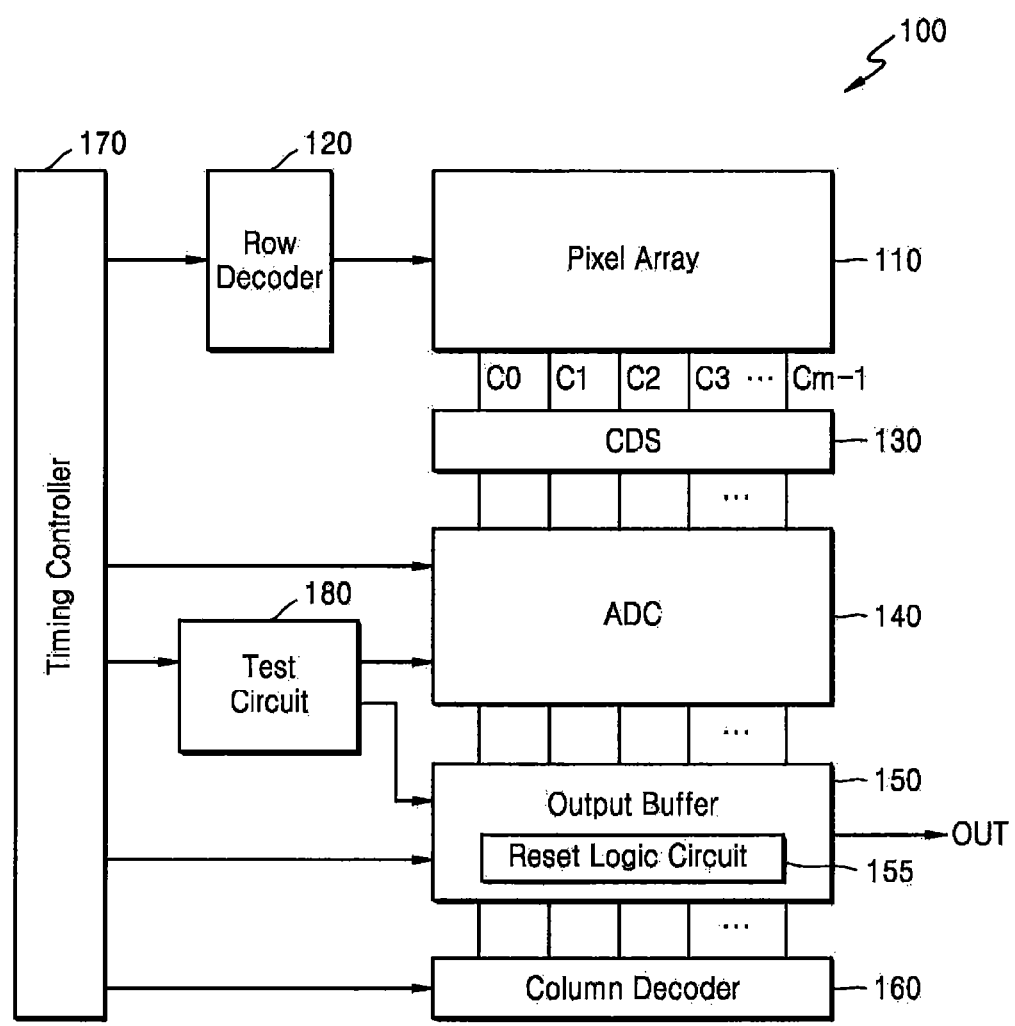
FIG. 1 is a block diagram of an image sensor according to an example embodiment of the inventive concepts provided herein.

FIG. 1 is a block diagram of an image sensor 100 according to an example embodiment of the inventive concepts provided herein.

Referring to FIG. 1, the image sensor 100 may include a pixel array 110, a row decoder 120, a correlated double sampler 130, an analog-to-digital converter (ADC) 140, an output buffer 150, a column decoder 160, a timing controller 170, and a test circuit 180.

The pixel array 110 may include a plurality of pixels arranged two-dimensionally. Each of the pixels may convert an optical signal into an electrical signal. The pixel array 110 may receive a driving signal including a row selection signal, a pixel reset signal, and a transmission signal from the row decoder 120, and the pixel array 110 may be driven by the driving signal.

The row decoder 120 may select any one of the rows of the pixel array 110 under the control of the timing controller 170. The row decoder 120 may generate the row selection signal to select any one of the rows. In addition, the row decoder 120 may sequentially generate the pixel reset signal and the transmission signal for the pixels corresponding to the selected row. Accordingly, an analog-type reference signal and an image signal generated from each of the pixels of the selected row may be sequentially transmitted to the correlated double sampler 130.

The correlated double sampler 130 may sequentially sample and hold the reference signal and the image signal provided to each of a plurality of column lines C0, C1, . . . , Cm−1 from the pixel array 110. That is, the correlated double sampler 130 may sample and hold a level of the reference signal and the image signal corresponding to each of the columns of the pixel array 110. The correlated double sampler 130 may transmit the reference signal and the image signal of each of the columns to the ADC 140 as a correlated double sampling signal under the control of the timing controller 170.

The ADC 140 may convert the correlated double sampling signal corresponding to each of the columns output from the correlated double sampler 130 into a digital signal, and may output the digital signal. The ADC 140 may perform a counting operation and an arithmetic operation based on the correlated double sampling signal corresponding to each of the columns, thereby generating image data from which noise of each of the columns has been removed.

The ADC 140 includes a plurality of column counters corresponding to each of the columns of the pixel array 110 and may use the column counters to convert the correlated double sampling signal corresponding to each of the columns into a digital signal. According to another example embodiment, the ADC 140 may include a global counter and may use a global code provided by the global counter to convert the correlated double sampling signal corresponding to each of the columns into a digital signal.

The output buffer 150 may capture image data of each column provided by the ADC 140 and may output the image data. The output buffer 150 may temporarily store image data output from the ADC 140 under the control of the timing controller 170. The output buffer 150 may operate as an interface to compensate for a difference in transmission rate between the image sensor 100 and other devices connected thereto.

The column decoder 160 selects a column of the output buffer 150 under the control of the timing controller 170, and the image data stored in the output buffer 150 may be sequentially output. In more detail, the column decoder 160 may receive an address signal from the timing controller 170, and the column decoder 160 may generate a column selection signal based on the address signal to select a column of the output buffer 150.

The timing controller 170 may control the row decoder 120, the column decoder 160, the ADC 140, and the output buffer 150. The timing controller 170 may provide clock signals required for operations and control signals for timing control to the row decoder 120, the column decoder 160, the ADC 140, and the output buffer 150. The timing controller 170 may include a logic control circuit, a phase locked loop (PLL) circuit, a timing control circuit, and a communication interface circuit.

The test circuit 180 may receive a test code in a test mode and may test counters included in the ADC 140 based on the test code. The test code may be generated by the image sensor 100 or provided externally. The test circuit 180 may generate a count clock signal and a count enable signal to test counting operations of the counters of the ADC 140. As a result of the test, the counters of the ADC 140 may generate counter test results and may provide the results to the output buffer 150, respectively. In an example embodiment, the test circuit 180 may be a built-in self-test circuit.

The output buffer 150 may include a plurality of memories for storing a plurality of counter test result values received from the ADC 140 in the test mode. In addition, the output buffer 150 may further include a reset logic circuit 155 capable of controlling a reset of the plurality of memories in the test mode. In an example embodiment, a memory may be implemented as static random access memory (SRAM). However, the memory is not limited thereto and may be implemented by various kinds of memories.

In an example embodiment, the output buffer 150 may receive a column selection signal from the column decoder 160, and may output a counter test result value from a memory corresponding to the column selection signal in response to the column selection signal. Here, the memory may be referred to as a column memory. The reset logic circuit 155 may reset a predetermined memory depending on whether the counter test result value is output from the predetermined memory. In other words, the reset logic circuit 155 may reset a memory that outputs the counter test result value. That is, the reset logic circuit 155 may perform a reset operation for a memory that outputs the counter test result value from among the plurality of memories of the output buffer 150. In an example embodiment, the reset logic circuit 155 may reset a memory corresponding to a column selection signal based on the column selection signal. The test circuit 180 may also enable the reset logic circuit 155 in a test mode and may disable the reset logic circuit 155 in a normal mode.

The output buffer 150 outputs a counter test result value from a memory using the column selection signal received from the column decoder 160 in FIG. 1. However, the inventive concepts provided herein are not limited thereto. The output buffer 150 may be configured to output a counter test result value from a memory using a row selection signal received from the row decoder 120. Furthermore, the reset logic circuit 155 may reset a memory corresponding to a row selection signal based on the row selection signal. However, all of the above-described configurations may be sufficiently derived from the inventive concepts provided herein. Hereinafter, for the convenience of description, a configuration for performing a reset operation based on a column selection signal of a column decoder will be mainly described.

As such, the image sensor 100 according to the inventive concepts provided herein performs a test operation on a plurality of counters or a global counter, and at the same time resets a memory that has output a counter test result value using the reset logic circuit 155. As a result, it is possible to detect whether or not an error has occurred with respect to a block related to an operation of generating a column selection signal. For example, the block related to an operation of generating a column selection signal may include the timing controller 170 that provides an address signal to the column decoder 160 or the column decoder 160. A detailed description thereof will be provided later below.

Figure 2:
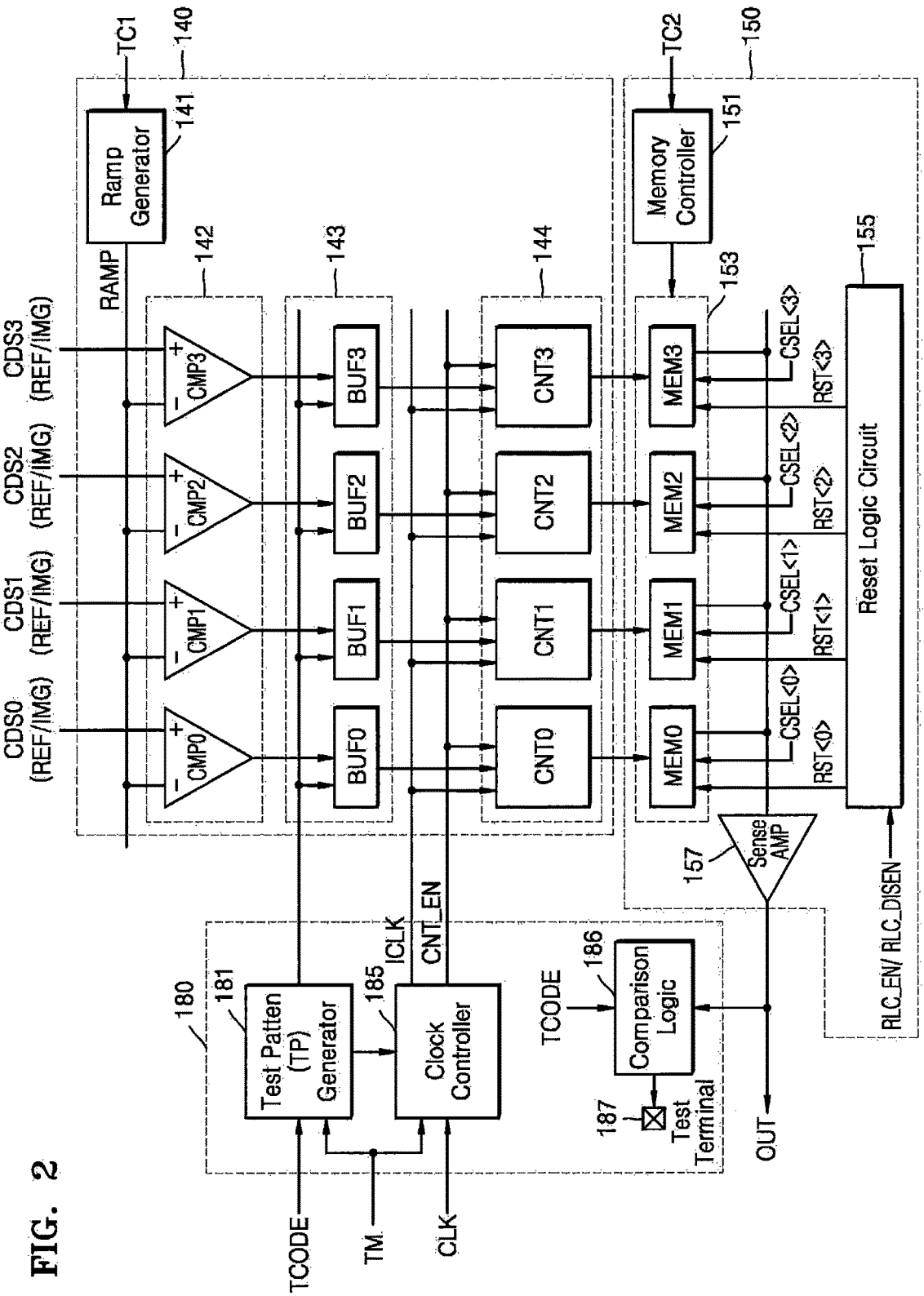
FIG. 2 is a block diagram of an analog-to-digital converter (ADC), an output buffer, and a test circuit in FIG. 1.

FIG. 2 is a block diagram of the ADC 140, the output buffer 150, and the test circuit 180 in FIG. 1.

By using correlated double sampling signal lines CDS0 to CDS3 respectively connected to the first to fourth column lines C0 to C3 from among the plurality of columns of the pixel array 110 of FIG. 1, the ADC 140, the output buffer 150, and the test circuit 180 associated therewith will be described in FIG. 2. The description of the first to fourth column lines C0 to C3 may be equally applied to the other column lines.

Referring to FIG. 2, the ADC 140 may include a ramp signal generator 141, a comparison unit 142, a buffer unit 143, and a counter unit 144. The ramp signal generator 141 may generate a ramp signal RAMP having a constant gradient in response to a control signal TC1 provided from the timing controller 170 (of FIG. 1). For example, the ramp signal generator 141 may generate the ramp signal RAMP having a falling gradient in response to the control signal TC1. The ramp signal generator 141 may generate the ramp signal RAMP having a rising gradient in response to the control signal TC1. The ramp signal RAMP is provided to the comparison unit 142 and used for a comparison operation of a reference signal REF held by the correlated double sampler 130 with an image signal IMG.

The comparison unit 142 includes first to fourth comparators CMP0, CMP1, CMP2, and CMP3 provided for the first to fourth column lines C0 to C3 of the pixel array 110, respectively. The first to fourth comparators CMP0, CMP1, CMP2, and CMP3 compare each of correlated double sampling signals REF/IMG transmitted to the correlated double sampling signal lines CDS0 to CDS3 respectively corresponding to the first to fourth columns C0 to C3 with the ramp signal RAMP.

The ramp signal RAMP is input to an inverting input terminal (−) of the first comparator CMP0, and the correlated double sampling signals REF/IMG of the first correlated double sampling signal line CDS0 is input to a non-inverting input terminal (+) of the first comparator CMP0. The first comparator CMP0 compares the ramp signal RAMP with the reference signal REF of the correlated double sampling signals REF/IMG in a first section and provides the result to a first buffer BUF0. Thereafter, the first comparator CMP0 compares the ramp signal RAMP with the image signal IMG of the correlated double sampling signals REF/IMG in a second section and provides the result to the first buffer BUF0.

Like the first comparator CMP0, the remaining comparators CMP1, CMP2, and CMP3 will also compare the ramp signal RAMP with the correlated double sampling signals REF/IMG for a corresponding column. A result of the comparison with this ramp signal RAMP will be provided to buffers BUF1, BUF2, and BUF3.

The buffer unit 143 may receive a test code TCODE provided by a test pattern generator 181. The buffer unit 143 may select and store one of the test code TCODE and outputs of the comparators CMP0 to CMP3. The buffer unit 143 includes the first to fourth buffers BUF0 to BUF3 corresponding to the first to fourth comparators CMP0 to CMP3, respectively.

Each of the first to fourth buffers BUF0 to BUF3 may store the test code TCODE in a test mode and may store the outputs of the comparators CMP0 to CMP3 in a normal mode. Each of the first to fourth buffers BUF0 to BUF3 may perform a function of interrupting a connection between the comparators CMP0 to CMP3 and counters CNT0 to CNT3 in a test mode.

Each of the counters CNT0 to CNT3 may perform a counting operation by synchronizing the comparison result of the comparators CMP0 to CMP3 stored in the buffers BUF0 to BUF3 with a clock signal CLK to generate a counting code. For example, each of the counters CNT0 to CNT3 may synchronize with the clock signal CLK to perform an up-counting operation and may generate a counting code. Each of the counters CNT0 to CNT3 may synchronize with the clock signal CLK to perform a down-counting operation and may generate a counting code. The counting code may be provided in binary code.

Figure 3:
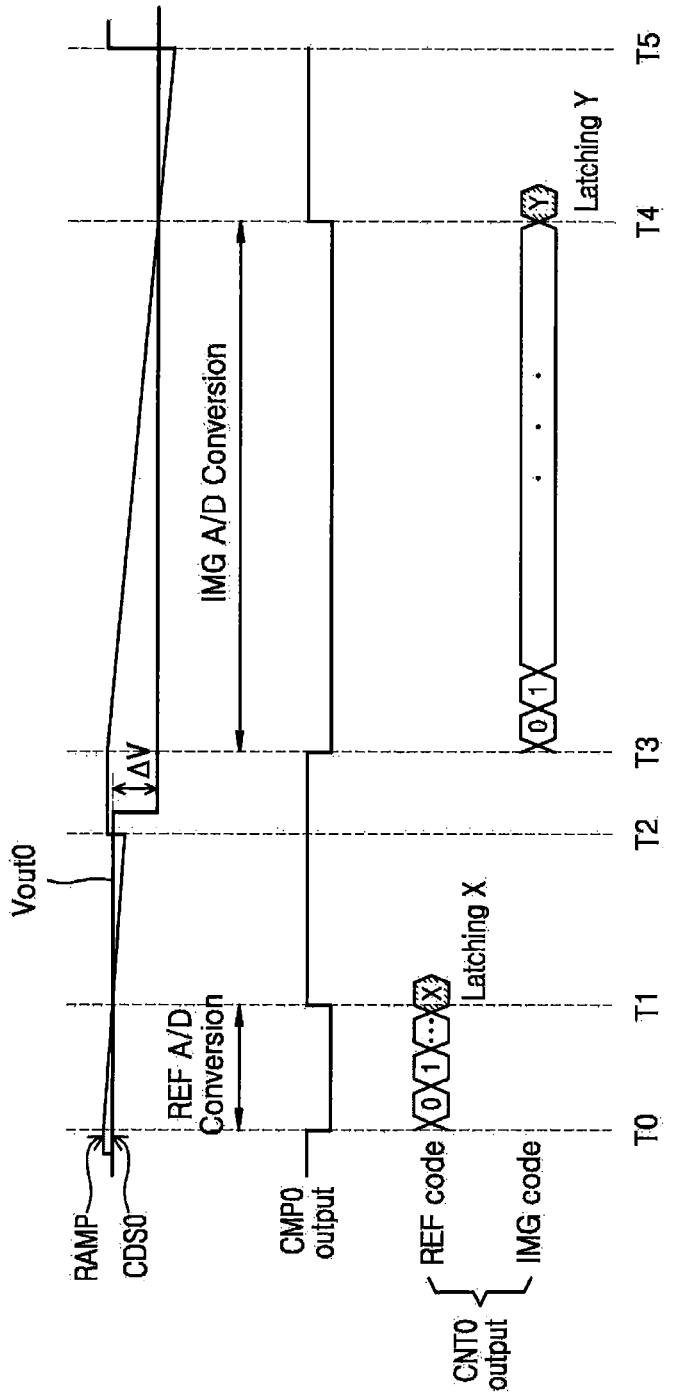
FIG. 3 is a timing diagram of an operation of the ADC of FIG. 2, according to an example embodiment of the inventive concepts provided herein.

Operations of the ADC 140 may be described with a timing diagram of FIG. 3. FIG. 3 illustratively describes the first correlated double sampling signal line CDS0 corresponding to one column line. The ADC 140 will process the remaining correlated double sampling signal lines CDS1 to CDS3 in the same way.

FIG. 3 is a timing diagram of an operation of the ADC 140 of FIG. 2, according to an example embodiment of the inventive concepts provided herein.

In FIG. 3, an operation section for converting the correlated double sampling signals REF/IMG, which are analog signals of the first correlated double sampling signal line CDS0, into digital signals may be roughly divided into two sections. One of the two sections is a section for converting the reference signal REF of the correlated double sampling signals REF/IMG into a digital signal, and timing from T0 to T2 in FIG. 3 may correspond thereto. The other is a section for converting the image signal IMG of the correlated double sampling signals REF/IMG into a digital signal, and timing from T3 to T5 in FIG. 3 may correspond thereto.

From the point in time T0, a gradient of the ramp signal RAMP falls. Thereafter, a comparison operation of the first comparator CMP0 is enabled, and an up-counting operation of the first counter CNT0 starts. An output of the first comparator CMP0 will maintain, for example, a logic low level, from the point in time T0 to the point in time T1 when a level of the ramp signal RAMP is higher than that of the reference signal REF of the correlated double sampling signals REF/IMG. Thereafter, the level of the reference signal REF of the first correlated double sampling signal line CDS0 becomes higher than that of a falling ramp signal RAMP from the point in time T1. Thus, the output of the first comparator CMP0 will transition to, for example, a logic high level.

At the point in time T1, the first counter CNT0 may be up-counted during a logic low level output section of the first comparator CMP0 to latch a digital signal value corresponding to the reference signal REF, that is, reference code X.

At the point in time T2, the ramp signal RAMP and the first counter CNT0 are initialized. That is, the ramp signal RAMP rises to a level of an initial ramp signal and the first counter CNT0 is reset. Then, the image signal IMG of the correlated double sampling signals REF/IMG is input to the first comparator CMP0. Here, the image signal IMG will be relatively lower than the reference signal REF since the image signal IMG is a pixel signal generated according to an integrated light charge corresponding to the amount of incident light.

From the point in time T3, a gradient of the ramp signal RAMP begins to fall. At the same time, the comparison operation of the first comparator CMP0 is enabled, and counting of the reset first counter CNT0 starts. The output of the first comparator CMP0 will remain at a logic low level from the point in time T3 to the point in time T4 when the level of the ramp signal RAMP is higher than that of the image signal IMG. When the level of the image signal IMG becomes higher than that of the ramp signal RAMP from the point in time T4, the output of the first comparator CMP0 may transition to a logic high level.

At the point in time T4, the first counter CNT0 is up-counted during a logic low level output section of the first comparator CMP0 so that a digital signal value corresponding to the image signal IMG, that is, image code Y, may be latched. The operation of converting the image signal IMG to a digital signal ends at the point in time T5.

As a result, the up-counting operation of the first counter CNT0 starts at each of the falling points in time T0 and T3 of the ramp signal RAMP, and the comparison operation of the first comparator CMP0 is enabled to output a comparison result of the ramp signal RAMP, and the reference signal REF and the image signal IMG of the correlated double sampling signals REF/IMG. The reference code X and the image code Y are obtained at the points in time T1 and T4 at which the output of the first comparator CMP0 transitions from a logic low level to a logic high level.

Referring again to FIG. 2, the ADC 140 may process the reference code X corresponding to the reference signal REF for each column and the image code Y corresponding to the image signal IMG by the counter unit 144 to output image data.

For example, the ADC 140 may further include an operator for performing a subtraction operation. The ADC 140 may subtract the reference code X from the image code Y corresponding to each of the columns using the operator. Accordingly, the ADC 140 may generate image data from which noise has been removed. The image data may be stored in a column memory unit 153 of the output buffer 150.

The output buffer 150 may include a memory controller 151, the column memory unit 153, the reset logic circuit 155, and a sense amplifier 157. The memory controller 151 may control input and output of column memories MEM0 to MEM3 in response to a control signal TC2 from the timing controller 170. The column memory unit 153 may include the column memories MEM0 to MEM3 for storing image data corresponding to each of the columns. The image data stored in each of the column memories MEM0 to MEM3 may be sequentially transmitted to the sense amplifier 157 according to column selection signals CSEL<0> to CSEL<3> provided by the column decoder 160 (of FIG. 1) and may be output to an outside (for example, image processor) of the output buffer 150.

The test circuit 180 may test the counters CNT0 to CNT3 according to a test mode signal TM and the clock signal CLK provided by the timing controller 170, and the test code TCODE. The test circuit 180 may include the test pattern generator 181, a clock controller 185, a comparison logic unit 186, and a test terminal 187.

The test pattern generator 181 receives the test code TCODE in response to the test mode signal TM and provides the test code TCODE to the buffer unit 143 and the clock controller 185. The test mode signal TM is a signal for instructing a test of the counters CNT0 to CNT3 of the ADC 140. The test code TCODE may be variously provided as code for controlling counting operations of the counters CNT0 to CNT3, in particular, the number of times of counting.

The clock controller 185 may receive the clock signal CLK, and may generate a count clock signal ICLK and a count enable signal CNT_EN according to the test code TCODE provided by the test pattern generator 181 in response to the test mode signal TM. The clock controller may provide the count clock signal ICLK and the count enable signal CNT_EN. However, the inventive concepts provided herein is not limited to the signals ICLK and CNT_EN generated by the clock controller 185 shown in FIG. 2. The clock controller 185 may control test operations by generating various signals and providing them to the counters CNT0 to CNT3.

The counters CNT0 to CNT3 may perform counting operations according to the count clock signal ICLK and the count enable signal CNT_EN in a test mode. Counter test result values of the counters CNT0 to CNT3 according to the count clock signal ICLK and the count enable signal CNT_EN may be stored in the column memory unit 153 of the output buffer 150. For example, a first counter test result value generated from the first counter CNT0 may be stored in the first column memory MEM0, a second counter test result value generated from the second counter CNT1 may be stored in the second column memory MEM1, a third counter test result value generated from the third counter CNT2 may be stored in the third column memory MEM2, and a fourth counter test result value generated from the fourth counter CNT3 may be stored in the fourth column memory MEM3.

The column memories MEM0 to MEM3 may respectively receive the column selection signals CSEL<0> to CSEL<3>, and in response, the column memories MEM0 to MEM3 may output the counter test result values stored therein to the sense amplifier 157. In an example embodiment, the first column memory MEM0 may output the first counter test result value to the sense amplifier 157 upon receiving the first column selection signal CSEL<0> having a logic high level. The second column memory MEM1 may output the second counter test result value to the sense amplifier 157 upon receiving the second column selection signal CSEL<1> having a logic high level. In this manner, the first to fourth counter test result values may be sequentially output to the sense amplifier 157 through the column memory unit 153, and the first to fourth counter test result values may be amplified and sequentially output to an outside of the output buffer 150 through the sense amplifier 157.

The reset logic circuit 155 may provide a reset signal to a column memory that outputs counter test result values from among the column memories MEM0 to MEM3. For example, when the first column memory MEM0 outputs the first counter test result value in response to the first column selection signal CSEL<0>, the reset logic circuit 155 may provide a first reset signal RST<0> having a logic high level to the first column memory MEM0. The first column memory MEM0 may delete the first counter test result value stored by the first reset signal RST<0>. In other words, the first column memory MEM0 may be initialized to reset data by the first reset signal RST<0> having a logic high level.

The test circuit 180 may control enable/disable operations of the reset logic circuit 155. In an example embodiment, the test circuit 180 may provide a reset logic circuit enable signal RLC_EN to the reset logic circuit 155 in a test mode, and in response, the reset logic circuit 155 may be enabled. In addition, the test circuit 180 may provide a reset logic circuit disable signal RLC_DISEN to the reset logic circuit 155 upon switching from the test mode to a normal mode, and in response, the reset logic circuit 155 may be disabled.

As such, during a test operation for the image sensor 100 according to the inventive concepts provided herein, the reset logic circuit 155 may control a reset operation for a column memory that outputs the stored counter test result values from among the column memories MEM0 to MEM3. The test circuit 180 may also provide the reset logic circuit 155 with various control signals necessary for the reset logic circuit 155 to perform the reset operation.

The comparison logic unit 186 may compare the counter test result values for the counters CNT0 to CNT3 output from the output buffer 150 with the test code TCODE, and may output the comparison result to the test terminal 187. If the counter test result values are equal to the test code TCODE, the comparison logic unit 186 may output a signal indicating a test pass to the test terminal 187. If the counter test result values are unequal to the test code TCODE, the comparison logic unit 186 may output a signal indicating a test fail to the test terminal 187.

Furthermore, the comparison logic unit 186 may detect whether the reset data is included in the counter test result values output from the output buffer 150. When the reset data is included in the counter test result values output from the output buffer 150, a signal indicating an error for a block generates the column selection signals CSEL<0> to CSEL<3>.

It is possible to check whether the test for the counters CNT0 to CNT3 is a pass or a fail by monitoring the signal output to the test terminal 187 and further to check whether the column decoder 160 or the timing controller 170 of FIG. 1 has an error.

Hereinafter, a method of testing the counters CNT0 to CNT3 of FIG. 2 and the column decoder 160 of FIG. 1 will be described in more detail with reference to FIGS. 4A to 9.

Figure 4A:
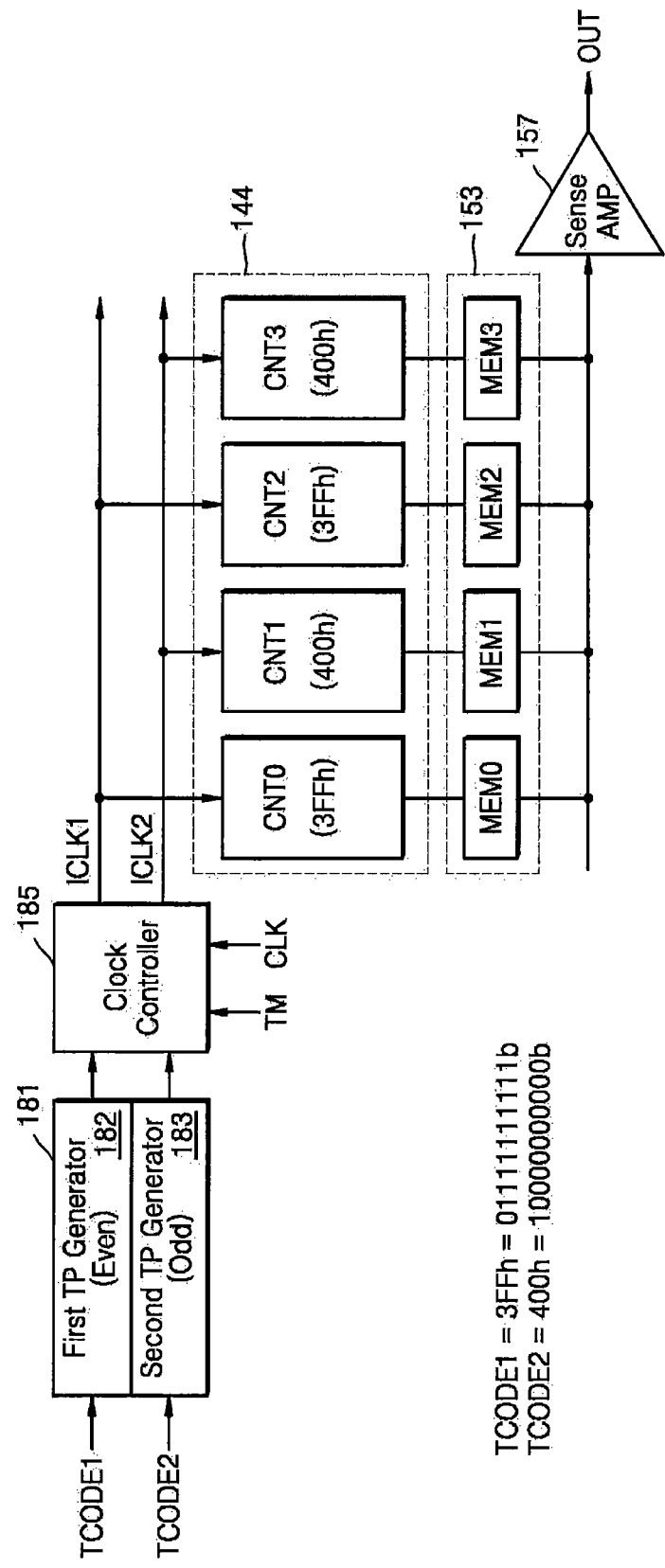
FIGS. 4A and 4B are block diagrams of a method of testing a counter unit, according to an example embodiment of the inventive concepts provided herein.
Figure 4B:
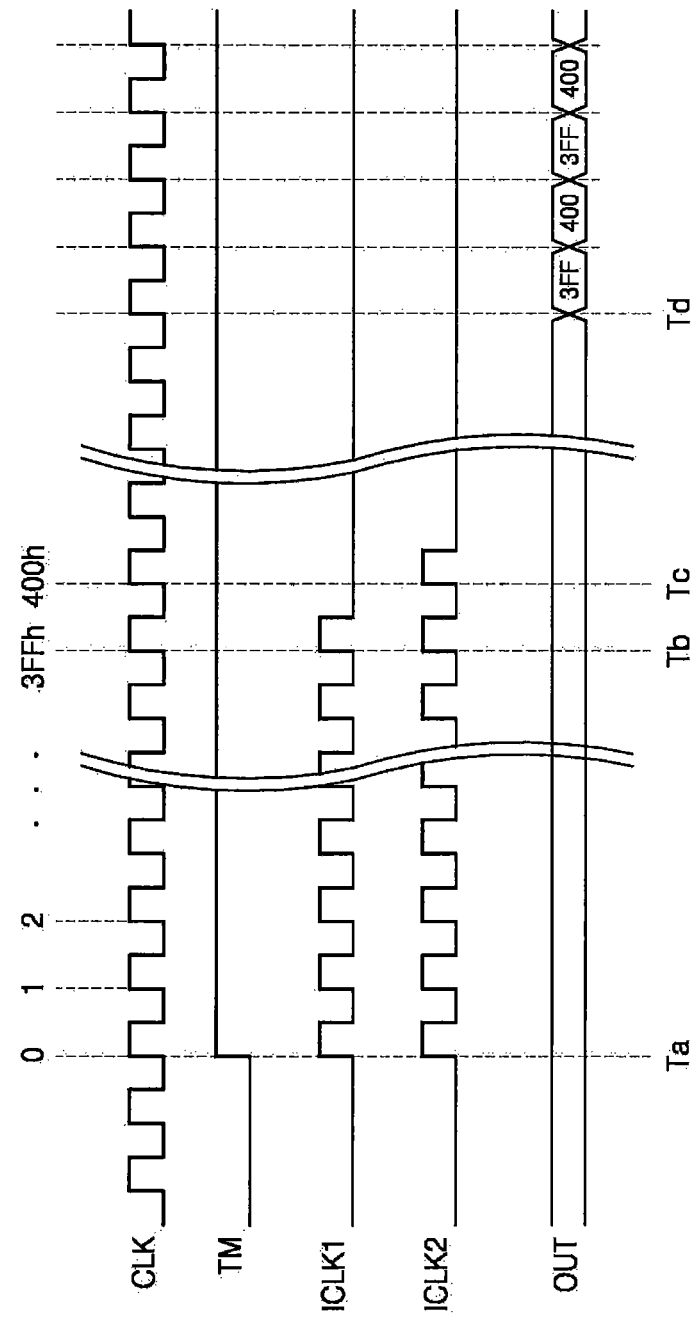

FIGS. 4A and 4B are block diagrams of a method of testing the counter unit 144, according to an example embodiment of the inventive concepts provided herein.

FIG. 4A illustrates a method of testing the counters CNT0 to CNT3 according to count clock signals ICLK1 and ICLK2 corresponding to test codes TCODE1 and TCODE2.

Referring to FIG. 4A, the test pattern generator 181 includes a first pattern generator 182 and a second pattern generator 183. The first pattern generator 182 receives the first test code TCODE1 for testing the counters CNT0 and CNT2 corresponding to the even column lines C0 and C2 in the column lines of the pixel array 110 (of FIG. 1), and provides the first test code TCODE1 to the clock controller 185. The second pattern generator 183 receives the second test code TCODE2 for testing the counters CNT1 and CNT3 corresponding to the odd column lines C1 and C3 in the column lines of the pixel array 110 (of FIG. 1), and provides the second test code TCODE2 to the clock controller 185.

For example, the first test code TCODE1 may be provided as a 01111111111b binary code of 11 bits or a 3FFh hex code, and the second test code TCODE2 may be provided as 10000000000b binary code of 11 bits or a 400h hex code. The 3FFh hex code and the 400h hex code may be used to implement a full-bit toggle system. The first and second test codes TCODE1 and TCODE2 may be variously provided according to an example embodiment.

The clock controller 185 receives the clock signal CLK and respectively generates the first and second count clock signals ICLK1 and ICLK2 corresponding to the first and second test codes TCODE1 and TCODE2 provided from the test pattern generator 181. For example, the clock controller 185 may generate the first count clock signal ICLK1 as a clock signal corresponding to the first test code TCODE1 provided by the first pattern generator 182. The clock controller 185 may generate the second count clock signal ICLK2 as a clock signal corresponding to the second test code TCODE2 provided by the second pattern generator 183. Hereinafter, the counters CNT0 and CNT2 corresponding to the even columns C0 and C2 are referred to as even counters, and the counters CNT1 and CNT3 corresponding to the odd columns C1 and C3 are referred to as odd counters.

The clock controller 185 may provide the first count clock signal ICLK1 to the even counters CNT0 and CNT2, and may provide the second count clock signal ICLK2 to the odd counters CNT1 and CNT3. According to an example embodiment, the first count clock signal ICLK1 may be provided to the odd counters CNT1 and CNT3, and the second count clock signal ICLK2 may be provided to the even counters CNT0 and CNT2.

Each of the even counters CNT0 and CNT2 may perform a counting operation according to the first count clock signal ICLK1. The first count clock signal ICLK1 is a clock signal corresponding to the first test code TCODE1. If the counting operation of the even counters CNT0 and CNT2 according to the first count clock signal ICLK1 is normal, counter test result values of the even counters CNT0 and CNT2 may be output as the first test code TCODE1. If the counting operation of the even counters CNT0 and CNT2 is abnormal, the counter test result values of the even counters CNT0 and CNT2 may be output as a value other than the first test code TCODE1.

Each of the odd counters CNT1 and CNT3 may perform a counting operation according to the second count clock signal ICLK2. The second count clock signal ICLK2 is a clock signal corresponding to the second test code TCODE2. If the counting operation of the odd counters CNT1 and CNT3 according to the second count clock signal ICLK2 is normal, counter test result values of the odd counters CNT1 and CNT3 may be output as the second test code TCODE2. If the counting operation of the odd counters CNT1 and CNT3 is abnormal, the counter test result values of the odd counters CNT1 and CNT3 may be output as a value other than the second test code TCODE2.

The counter test result values of the counters CNT0 to CNT3 may be respectively stored in the corresponding column memories MEM0 to MEM3 and sequentially output through the sense amplifier 157. A test operation for the counters CNT0 to CNT3 will be described with reference to FIG. 4B.

Referring to FIG. 4B, the clock signal CLK may be provided to the clock controller 185.

At a point in time Ta, the clock controller 185 may generate the first count clock signal ICLK1 corresponding to 3FFh, which is the first test code TCODE1, in response to the test mode signal TM, and may output the first count clock signal ICLK1 to the even counters CNT0 and CNT2. The clock controller 185 may generate the second count clock signal ICLK2 corresponding to 400h, which is the second test code TCODE2, in response to the test mode signal TM, and may provide the second count clock signal ICLK2 to the odd counters CNT1 and CNT3.

From the point in time Ta to a point in time Tb, the even counters CNT0 and CNT2 may count the first count clock signal ICLK1 and may output the counter test result values.

From the point in time Ta to a point in time Tc, the odd counters CNT1 and CNT3 may count the second count clock signal ICLK2 and may output the counter test result values.

From a point in time Td, the counters CNT0 to CNT3 may output the counter test result values 3FFh, 400h, 3FFh, and 400h through the output buffer 150 in an order of the first counter CNT0, the second counter CNT1, the third counter CNT2, and the fourth counter CNT3, that is, the even counter CNT0, the odd counter CNT1, the even counter CNT2, and the odd counter CNT3.

At the point in time Td, 3FFh-400h-3FFh-400h corresponding to the counter test result values of the counters CNT0-CNT3 that are sequentially output may be compared with the first test code TCODE1-the second test code TCODE2-the first test code TCODE1-the second test code TCODE2 in the comparison logic unit 186 (of FIG. 2). The comparison logic unit 186 may output a signal indicating a test pass to the test terminal 187 (of FIG. 2) when counting values of the counters CNT0 to CNT3 are equal to the test codes TCODE1 and TCODE2, and may output a signal indicating a test fail when the counting values of the counters CNT0 to CNT3 are unequal to the test codes TCODE1 and TCODE2. In an example embodiment, the test terminal 187 (of FIG. 2) may output a logic high level signal on a test pass and a logic low level signal on a test fail.

Thereafter, by monitoring a signal of the test terminal 187 (FIG. 2), it is possible to check whether a counting operation test for the counters CNT0 to CNT3 is pass or fail. However, since the counting operation test for the counters CNT0 to CNT3 of FIGS. 4A and 4B is only an example embodiment, various methods of the counting operation test may be applied without being limited thereto.

Figure 5:
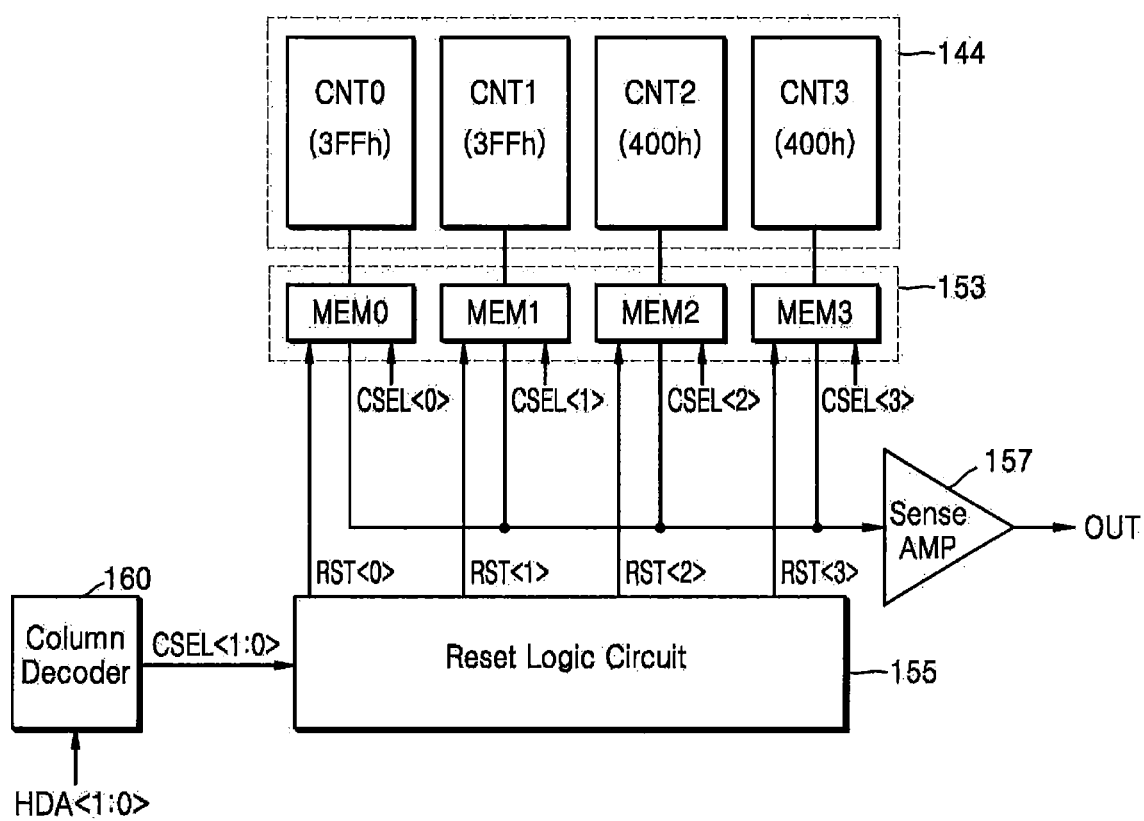
FIG. 5 is a block diagram of an operation of a reset logic circuit, according to an example embodiment of the inventive concepts provided herein.
Figure 6B:
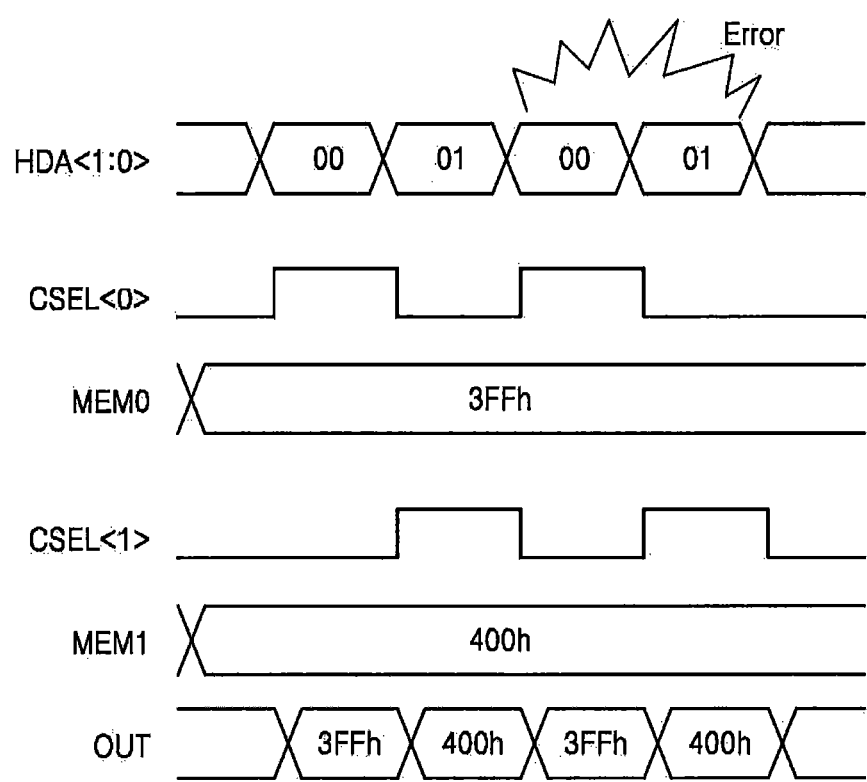
Figure 6C:
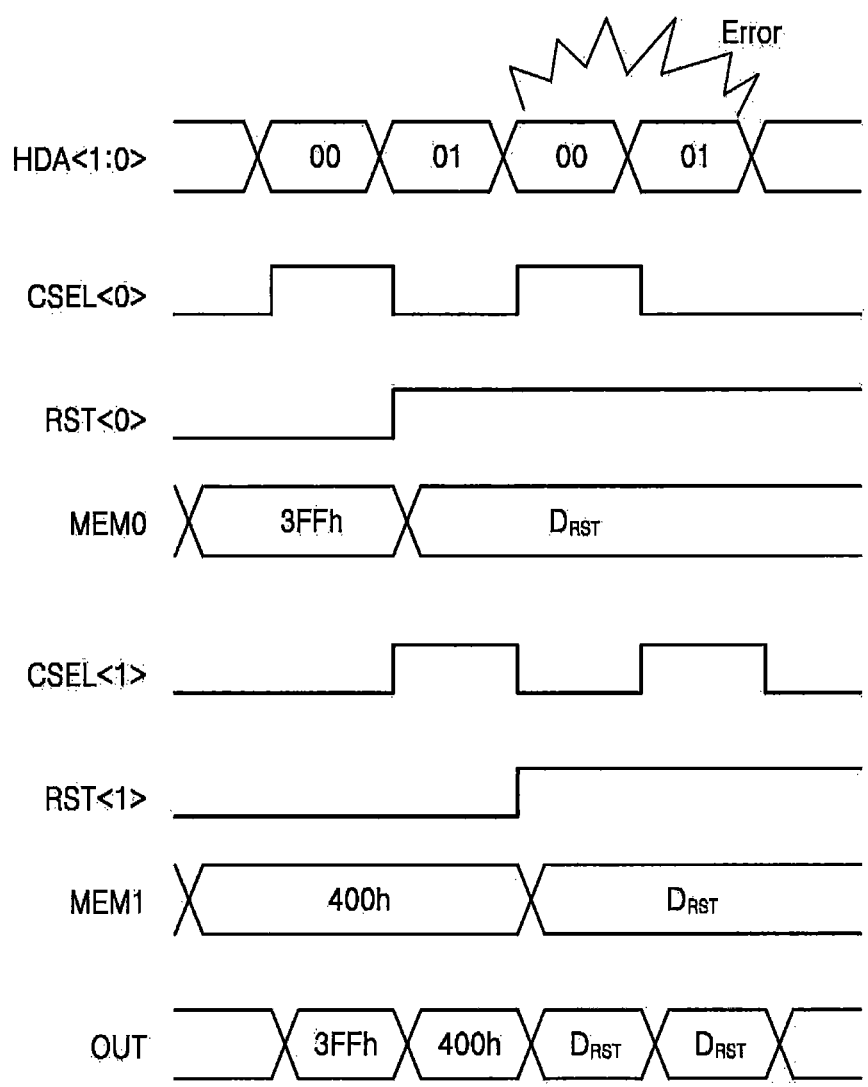

FIG. 5 is a block diagram of an operation of the reset logic circuit 155, according to an example embodiment of the inventive concepts provided herein, and FIGS. 6A to 6C are timing diagrams for explaining a method of detecting an error in a column decoder using the reset logic circuit 155 of FIG. 5.

Referring to FIG. 5, the column decoder 160 may receive an address signal HDA<1:0> from the timing controller 170 of FIG. 1. The column decoder 160 may generate a column selection signal CSEL<1:0> based on the address signal HDA<1:0>, and may provide the column selection signal CSEL<1:0> to the column memory unit 153 and the reset logic circuit 155.

The column memories CNT0 to CNT3 may respectively receive the column selection signals CSEL<0> to CSEL<3> and, in response, may output the respective counter test result values stored in the column memories CNT0 to CNT3 through the sense amplifier 157.

The reset logic circuit 155 may receive the column selection signal CSEL<1:0> and may generate the reset signals RST<0> to RST<3> based on the column selection signal CSEL<1:0> to provide the reset signals RST<0> to RST<3> to the corresponding column memories CNT0 to CNT3, respectively. However, configurations of FIG. 5 correspond to an exemplary configuration for explaining the inventive concepts provided herein, but are not limited thereto. Configurations of the address signal HDA<1:0>, the column selection signal CSEL<1:0>, the counters CNT0 to CNT3, and the column memories MEM0 to MEM3 may be variously implemented.

Further referring to FIG. 6A, the column decoder 160 may receive the address signal HDA<1:0> having a value of 00-01-10-11. The column decoder 160 may generate the first column selection signal CSEL<0> having a logic high level and may provide the first column selection signal CSEL<0> to the first column memory MEM0 when the address signal HDA<1:0> is a value of 00. The first column memory MEM0 may output a first counter test result value of 3FFh in response to the first column selection signal CSEL<0> having a logic high level. The column decoder 160 may generate the second column selection signal CSEL<1> having a logic high level and may provide the second column selection signal CSEL<1> to the second column memory MEM1 when the address signal HDA<1:0> is a value of 01. The second column memory MEM1 may output a second counter test result value of 400h in response to the second column selection signal CSEL<1> having a logic high level. In this manner, the column memory unit 153 may sequentially output the first to fourth counter test results, and an output signal OUT may have the value of 3FFh-400h-3FFh-400h.

In FIG. 6B, unlike FIG. 6A, for example, it is assumed that an error occurs in a process of generating the address signal HDA<1:0> by the timing controller 170 of FIG. 1, and the column decoder 160 receives the address signal HDA<1:0> of a 00-01-00-01 value in which some addresses are repeated.

The column decoder 160 may generate the first column selection signal CSEL<0> having a logic high level again by the address signal HDA<1:0> of a 00-01 value repeated due to an error. Accordingly, the first column memory MEM0 may output the first counter test result value of 3FFh once more. Furthermore, the second column selection signal CSEL<1> may have a logic high level again by the repeated address signal HDA<1:0> of the 00-01 value. Accordingly, the second column memory MEM1 may output the second counter test result value of 400h once more. As a result, the output signal OUT may have a value of 3FFh-400h-3FFh-400h. That is, since an output signal OUT when an error occurs in the process of generating the address signal HDA<1:0> by the timing controller 170 and an output signal OUT when a correct address signal HDA<1:0> is generated as shown in FIG. 6A are the same, the test circuit 180 in FIG. 1 may not be able to detect errors related to the generation of a wrong address signal HDA<1:0>. Hereinafter, the operation of the reset logic circuit 155 of the inventive concepts provided herein to overcome the problem will be described with reference to FIG. 6C.

Referring to FIG. 6C, after the first column memory MEM0 outputs the first counter test result value of 3FFh in a section where the first column selection signal CSEL<0> has a logic high level, the reset logic circuit 155 may generate the first reset signal RST<0> having a logic high level and may provide the first reset signal RST<0> to the first column memory MEM0. The first column memory MEM0 may be reset to reset data $D_{RST}$ in response to the first reset signal RST<0>. In an example embodiment, the reset data $D_{RST}$ may have a value of zero.

Furthermore, after the second column memory MEM1 outputs the second counter test result value of 400h in a section where the second column selection signal CSEL<1> has a logic high level, the reset logic circuit 155 may generate the second reset signal RST<1> having a logic high level and may provide the second reset signal RST<1> to the second column memory MEM1. The second column memory MEM1 may be reset to the reset data $D_{RST}$ in response to the second reset signal RST<1>.

Thereafter, when the first column selection signal CSEL<0> and the second column selection signal CSEL<1> have a logic high level again based on the address signal HDA<1:0> of the 00-01 value repeated due to an error in the timing controller 170, the first column memory MEM0 and the second column memory MEM1 may output the reset data $D_{RST}$, respectively. Accordingly, the output signal OUT output through the column memory unit 153 may have a value of 3FFh-400h-$D_{RST}$-$D_{RST}$. Since the output signal OUT of FIG. 6C is different from the output signal OUT of FIG. 6A, it is possible to detect an error with respect to the timing controller 170 by checking the output signal OUT.

In an example embodiment, the first and second reset signals RST<0> and RST<1> having a logic high level may be reset to have a logic low level upon switching from a test mode to a normal mode. In another example embodiment, assuming that the test operation described in FIG. 6C is a first test operation, the first and second reset signals RST<0> and RST<1> having a logic high level at the beginning of the second test operation may be reset to have a logic low level. As such, the resetting of the reset signals RST<0> and RST<1> to a logic low level may be controlled by the test circuit 180 of FIG. 1.

FIGS. 6A to 6C mainly illustrate a case of detecting an error in the timing controller 170 that generates the wrong address signal HDA<1:0>. However, the inventive concepts provided herein are not limited thereto, and the resetting may be applied to detect an error in the column decoder 160 that generates a wrong column selection signal CSEL<1:0>.

Figure 7:
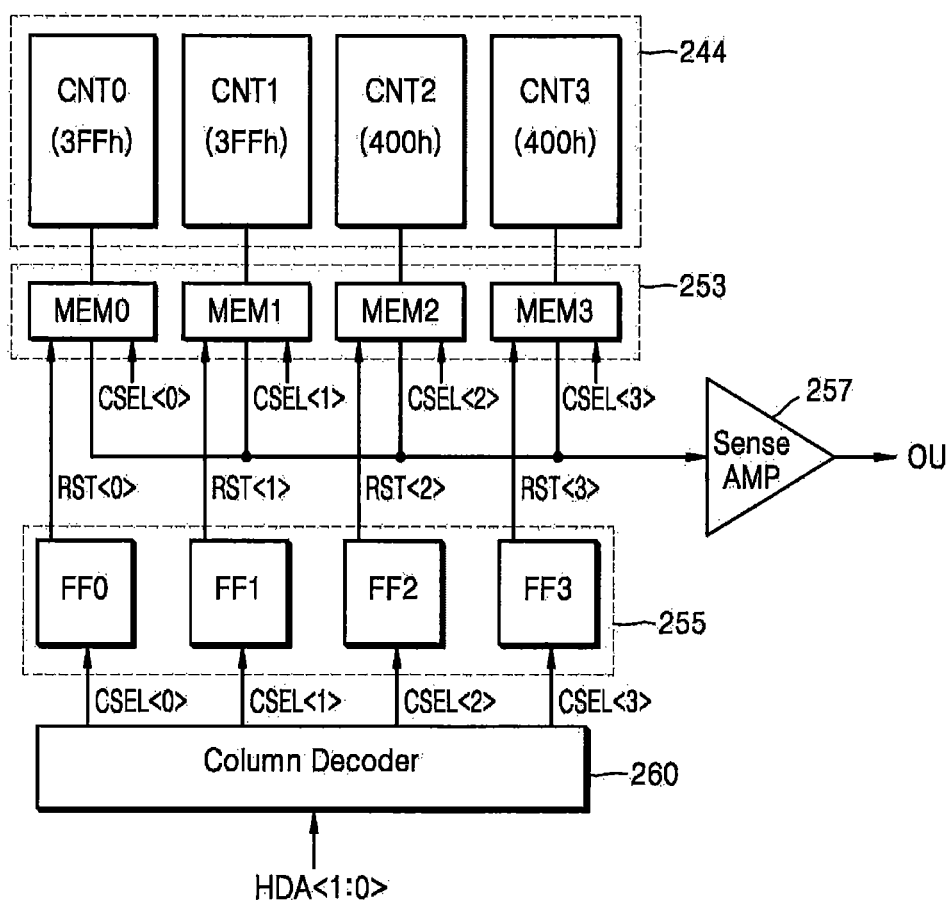
FIG. 7 is a block diagram of a reset logic circuit according to an example embodiment of the inventive concepts provided herein.
Figure 8A:
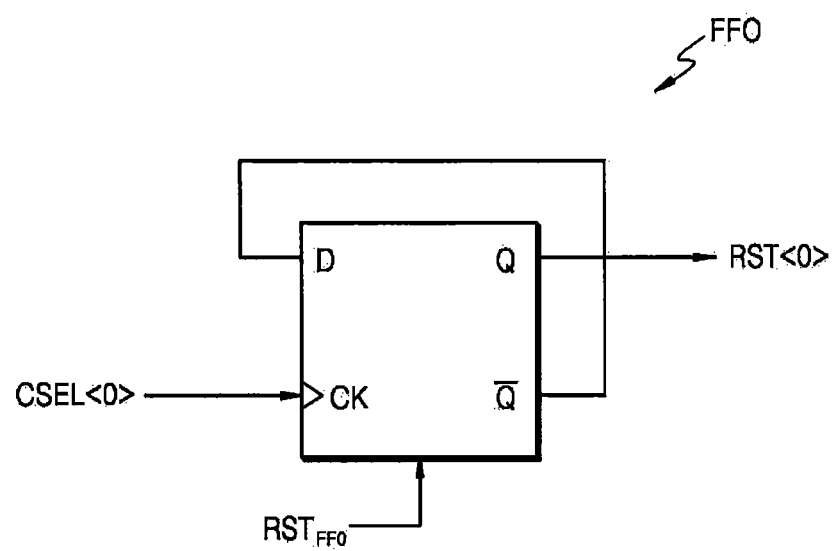
FIG. 8A is a diagram for explaining a first flip-flop of FIG. 7.

FIG. 7 is a block diagram of a reset logic circuit 255 according to an example embodiment of the inventive concepts provided herein. FIG. 8A is a diagram for explaining a first flip-flop FF0 of FIG. 7, and FIG. 8B is a timing diagram for explaining an operation of the reset logic circuit 255 of FIG. 7.

Referring to FIG. 7, the first to fourth counters CNT0 to CNT3 included in a counter unit 244 may respectively generate 3FFh, 400h, 3FFh, and 400h as counter test result values, and may store the counter test result values in the first to fourth column memories MEM0 to MEM3, respectively. In an example embodiment, the reset logic circuit 255 may include a plurality of flip-flops FF0-FF3.

A column decoder 260 receives the address signals HDA<1:0>, and in response, the column decoder 260 may provide the column selection signals CSEL<0> to CSEL<3> to the column memories MEM0 to MEM3, respectively. In more detail, the column decoder 260 may provide the first column selection signal CSEL<0> to the first column memory MEM0, the second column selection signal CSEL<1> to the second column memory MEM1, the third column selection signal CSEL<2> to the third column memory MEM2, and the fourth column selection signal CSEL<3> to the fourth column memory MEM3.

Furthermore, the column decoder 260 may provide the column selection signals CSEL<0> to CSEL<3> to the reset logic circuit 255. In more detail, the column decoder 260 may provide the first column selection signal CSEL<0> to the first flip-flop FF0, the second column selection signal CSEL<1> to the second flip-flop FF1, the third column selection signal CSEL<2> to the third flip-flop FF22, and the fourth column selection signal CSEL<3> to the fourth flip-flop FF3.

In an example embodiment, the first column memory MEM0 may output the first counter test result value of 3FFh to a sense amplifier 257 in response to the first column selection signal CSEL<0> having a logic high level. Thereafter, the first flip-flop FF0 may provide the first reset signal RST<0> having a logic high level to the first column memory MEM0 to control the first column memory MEM0 to be reset. In this manner, a flip-flop corresponding to a predetermined column memory may control the predetermined column memory to be reset by using a reset signal for a predetermined column memory that outputs stored counter test result values once.

Further referring again to FIG. 8A, the first flip-flop FF0 according to an example embodiment of the inventive concepts provided herein may generate the first reset signal RST<0> based on the first column selection signal CSEL<0>. That is, the first flip-flop FF0 may change a level of the first reset signal RST<0> by changing a level of the first column selection signal CSEL<0>. The first column selection signal CSEL<0> is applied to a CK terminal of the first flip-flop FF0, and a D terminal and a $\overline{Q}$ terminal are electrically connected to each other. The first reset signal RST<0> may be output from a Q terminal of the first flip-flop FF0. Also, the first flip-flop FF0 may be reset by receiving a flip-flop reset signal $RST_{FF0}$ from an outside of the first flip-flop (or from the test circuit 180 of FIG. 1) at the beginning of a test mode or at the end of the test mode. A configuration of the first flip-flop FF0 may also be applied to the flip-flops FF0 to FF3 of FIG. 7. However, the configuration of the first flip-flop FF0 shown in FIG. 8A is only an example embodiment, and the reset logic circuit 255 may include flip-flops of various configurations capable of performing a reset operation for the column memories MEM0 to MEM3.

Further referring again to FIG. 8B, in a state that signals of the D terminal and the $\overline{Q}$ terminal have a logic high level, the signals of the D terminal and the $\overline{Q}$ terminal may transition from a logic high level to a logic low level at first timing T1' at which the first column selection signal CSEL<0> input to the CK terminal transitions from a logic high level to a logic low level, that is, at a falling edge. Accordingly, the first reset signal RST<0> output from the Q terminal may have a logic high level after the first timing T1'. Accordingly, the first counter test result value of 3FFh stored in the first column memory MEM0 may be reset in response to the first reset signal RST<0> having a logic high level. Therefore, when the first column selection signal CSEL<0> has a logic high level again due to the wrong address signal HDA<1:0>, the first column memory MEM0 may detect an error by outputting the reset data $D_{RST}$.

Subsequently, signals of the D terminal and the $\overline{Q}$ terminal may transition from a logic low level to a logic high level at second timing T2' at which the first column selection signal CSEL<0> input to the CK terminal transitions again from a logic high level to a logic low level. Accordingly, the first reset signal RST<0> output from the Q terminal may have a logic low level after the second timing T2'.

Figure 9:
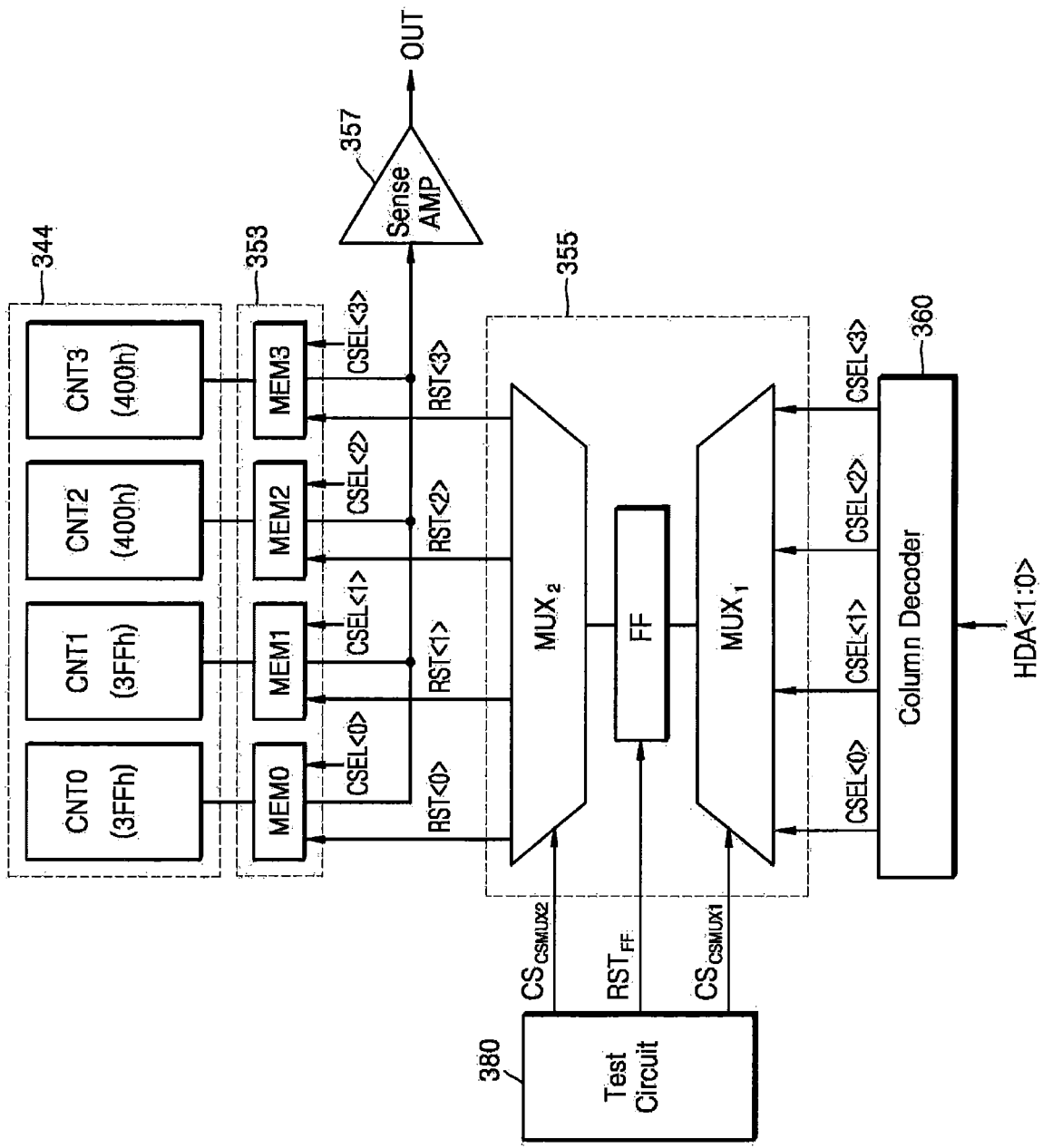
FIG. 9 is a block diagram of a reset logic circuit according to an example embodiment of the inventive concepts provided herein.

FIG. 9 is a block diagram of a reset logic circuit 355 according to an example embodiment of the inventive concepts provided herein.

A configuration of the reset logic circuit 355 shown in FIG. 9 may be different from that of the reset logic circuit 255 of FIG. 7. Since the rest of the configuration of FIG. 9 is similar to that of FIG. 7, the configuration of the reset logic circuit 355 will be mainly described later below.

In an example embodiment, the reset logic circuit 355 may include a first multiplexer $MUX_1$, a flip flop FF, and a second multiplexer $MUX_2$. A test circuit 380 may control signal selection operations of the first multiplexer $MUX_1$ and the second multiplexer $MUX_2$ based on an output order of counter test result values of each of the column memories MEM0 to MEM3. That is, the test circuit 380 may control the reset logic circuit 355 to directly reset a column memory outputting counter test result values. For example, when the first to fourth column memories MEM0 to MEM3 sequentially output the respective counter test result values, the test circuit 380 may control the reset logic circuit 355 so that the first to fourth column memories MEM0 to MEM3 may be sequentially reset. Hereinafter, a specific operation of the reset logic circuit 355 will be described.

The first multiplexer $MUX_1$ may receive the plurality of column selection signals CSEL<0> to CSEL<3>. The first multiplexer $MUX_1$ may receive a first control signal $CS_{CSMUX1}$ from the test circuit 380 and may provide any one of the column selection signals CSEL<0> to CSEL<3> to the flip-flop FF based on the first control signal $CS_{CSMUX1}$. The flip-flop FF may generate a reset signal based on a selectively received column selection signal and may provide the reset signal to the second multiplexer $MUX_2$. The second multiplexer $MUX_2$ may receive a second control signal $CS_{CSMUX2}$ from the test circuit 380 and may provide a reset signal generated from the flip-flop FF to any one of the column memories MEM0 to MEM3 based on the second control signal.

For example, the first multiplexer $MUX_1$ may select the first column selection signal CSEL<0> based on the first control signal $CS_{CSMUX1}$ and may provide the first column selection signal CSEL<0> to the flip-flop FF. The flip-flop FF may generate a reset signal based on the first column selection signal CSEL<0> and may provide the reset signal to the second multiplexer MUX$_2$. Since an operation of the flip-flop FF is the same as that of the first flip-flop FF0 described with reference to FIG. 8A and the like, a specific method of generating a reset signal will not be given herein. The second multiplexer MUX$_2$ may provide the reset signal received from the flip-flop FF to the first column memory MEM0 as the first reset signal RST<0> based on the second control signal CS$_{CSMUX2}$.

After the first column memory MEM0 outputs the first counter test result value of 3FFh in response to the first column selection signal CSEL<0>, the first column memory MEM0 may be reset by the first reset signal RST<0>. After the first reset signal RST<0> is provided to the first column memory MEM0 through the second multiplexer MUX$_2$, the test circuit 380 may provide the flip-flop FF with a flip-flop reset signal RST$_{FF}$ to reset the flip-flop FF. That is, after performing a reset operation for any one of the column memories, the test circuit 380 may reset the flip-flop FF using the flip-flop reset signal RST$_{FF}$ to perform a reset operation for the other column memories. Thereafter, when the second counter test result value of 400h stored in the second column memory MEM1 is output in response to the second column selection signal CSEL<1>, the test circuit 380 may control the reset logic circuit 355 to perform a reset operation for the second column memory MEM1.

As such, the reset logic circuit 355 according to an example embodiment of the inventive concepts provided herein is capable of performing a reset operation on the plurality of column memories MEM0 to MEM3 using one flip-flop FF.

Figure 10:
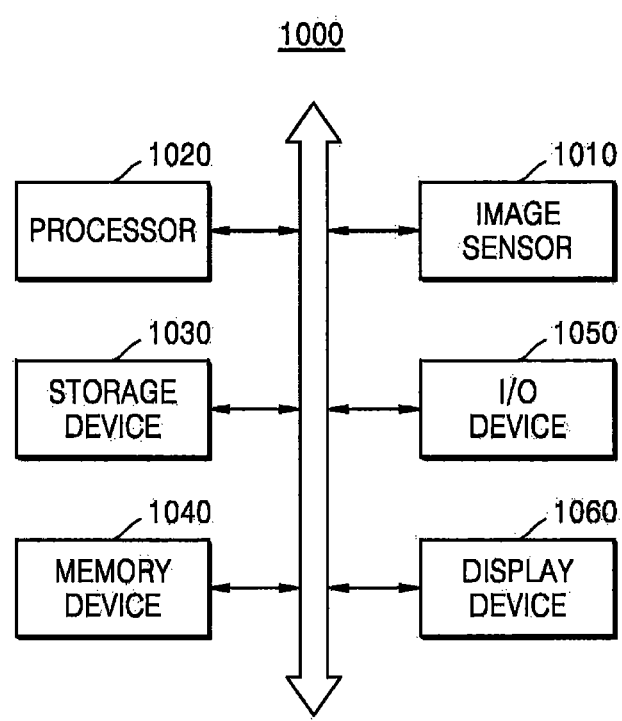
FIG. 10 is a block diagram of a computing system including an image sensor, according to an example embodiment of the inventive concepts provided herein.

FIG. 10 is a block diagram of a computing system 1000 including an image sensor 1010, according to an example embodiment of the inventive concepts provided herein.

Referring to FIG. 10, the computing system 1000 includes an image sensor 1010, a processor 1020, a storage device 1030, a memory device 1040, an input/output device 1050, and a display device 1060. Although not shown in FIG. 10, the computing system 1000 may communicate with video cards, sound cards, memory cards, universal serial bus (USB) devices, and the like, or may further include ports capable of communicating with other electronic devices.

The image sensor 1010 generates image data corresponding to incident light. The display device 1060 displays the image data. The storage device 1030 stores image data. The processor 1020 controls operations of the image sensor 1010, the display device 1060, and the storage device 1030.

The processor 1020 may perform certain calculations or tasks. According to an example embodiment, the processor 1020 may be connected to the storage device 1030, the memory device 1040, and the input/output device 1050 via an address bus, a control bus, and a data bus to perform communication. According to an example embodiment, the processor 1020 may also be connected to an expansion bus, such as a Peripheral Component Interconnect (PCI) bus.

The storage device 1030 may include a flash memory device, a solid state drive (SSD), a hard disk drive (HDD), a CD-ROM, various types of nonvolatile memory devices, and the like.

The memory device 1040 may store data for an operation of the computing system 1000. For example, the memory device 1040 may include a volatile memory device such as dynamic random access memory (DRAM), static random access memory (SRAM), or the like, and a nonvolatile memory device such as erasable programmable read-only memory (EPROM), electrically erasable programmable read-only memory (EEPROM), flash memory, or the like.

The input/output device 1050 may include input units such as a keyboard, a keypad, a mouse, etc., and output units such as a printer, a display, and the like.

The image sensor 1010 may be implemented with the image sensor 100 shown in FIG. 1. The image sensor 100 of FIG. 1 may include the test circuit 180 and the reset logic circuit 155. The image sensor 1010 may perform a counting operation according to a count clock signal, using the test circuit 180, with respect to the counting operation according to the count clock signal corresponding to a test code and a count enable signal in a section corresponding to the test code. Furthermore, the image sensor 1010 may detect whether an error has occurred with respect to a block related to an operation of generating a column selection signal by resetting a column memory that outputs counter test result values using the reset logic circuit 155 during a test operation.

The image sensor 1010 may be implemented with various types of packages. For example, at least some components of the image sensor 1010 may be implemented using a package such as a Package On Package (PoP), Ball Grid Arrays (BGA), a Chip Scale Package (CSP), a Plastic Leaded Chip Carrier (PLCC), a Plastic Dual In-line Package (PDIP), a Die in Waffle Pack, a Die in Wafer Form, a Chip On Board (COB), a CERamic Dual In-line Package (CERDIP), a Metric Quad Flat Package (MQFP), a Thin Quad FlatPack (TQFP), a Small Outline Integrated Circuit (SOIC), a Shrink Small Outline Package (SSOP), a Thin Small Outline Package (TSOP), a System In Package (SIP), a Multi Chip Package (MCP), a Wafer-level Fabricated Package (WFP), a Wafer-level processed Stack Package (WSP), or the like. Depending on an example embodiment, the image sensor 1010 may be integrated into one chip with the processor 102Q, or may be integrated into different chips, respectively. The above-described computing system 1000 should be understood as any computing system that uses the image sensor 1010. For example, the computing system 1000 may include a digital camera, a mobile phone, a personal digital assistant (PDA), a portable multimedia player (PMP), a smart phone, and the like.

It should be understood that example embodiments described herein should be considered in a descriptive sense only and not for purposes of limitation. Descriptions of features or aspects within each example embodiment should typically be considered as available for other similar features or aspects in other example embodiments. While one or more example embodiments have been described with reference to the figures, it will be understood by those of ordinary skill in the art that various changes in form and details may be made therein without departing from the spirit and scope as defined by the following claims.

While the inventive concepts provided herein have been particularly shown and described with reference to example embodiments thereof, it will be understood that various changes in form and details may be made therein without departing from the spirit and scope of the following claims.

What is claimed is:

1. An image sensor comprising:
   a pixel array including a plurality of pixels, the plurality of pixels being configured to generate an analog signal in response to incident light;
   an analog-to-digital converter having a first counter configured to convert the analog signal into a digital signal; and an output buffer having a first memory in which a first counter test result value generated as a test result for the first counter is stored in a test mode, and configured to output the first counter test result value in response to a first selection signal, wherein the output buffer further includes a reset logic circuit configured to reset the first memory depending on whether the first counter test result value is output or not.

2. The image sensor of claim 1, wherein the reset logic circuit is configured to reset the first memory based on the first selection signal.

3. The image sensor of claim 1, wherein the output buffer is configured to output the first counter test result value from the first memory when the first selection signal is at a second level, and the reset logic circuit is configured to reset the first memory when the first selection signal transits from the second level to a first level.

4. The image sensor of claim 1, wherein the analog-to-digital converter further includes a second counter, the output buffer further includes a second memory in which a second counter test result value generated as a test result for the second counter is stored, and the reset logic circuit is configured to reset the second memory after outputting the second counter test result value.

5. The image sensor of claim 4, wherein the reset logic circuit includes:

a first flip-flop configured to receive the first selection signal, generate a first reset signal based on the first selection signal, and output the first reset signal to the first memory; and a second flip-flop configured to receive a second selection signal, generate a second reset signal based on the second selection signal, and output the second reset signal to the second memory.

6. The image sensor of claim 5, wherein the first flip-flop and the second flip-flop are reset at a beginning of the test mode or at an end of the test mode.

7. The image sensor of claim 4, further comprising a test circuit configured to control a test operation for the first and second counters, wherein the test circuit is configured to apply a first count clock signal generated based on a first test code to the first counter, and apply a second count clock signal generated based on a second test code to the second counter.

8. The image sensor of claim 7, wherein the test circuit is configured to detect whether there is an error in the image sensor using the first counter test result value and the second counter test result value.

9. An image sensor comprising:

a pixel array including a plurality of pixels;

an analog-to-digital converter configured to use at least one counter to convert an analog signal generated from the plurality of pixels into a digital signal;

an output buffer configured to correspond to each of a plurality of columns connected to the pixel array, and having a plurality of column memories configured to store counter test result values; and a test circuit configured to control a test operation for the at least one counter, wherein the output buffer receives a column selection signal and outputs a counter test result stored in a column memory corresponding to the column selection signal in response to the column selection signal, and the output buffer resets the column memory corresponding to the column selection signal.

10. The image sensor of claim 9, wherein the output buffer further includes a reset logic circuit configured to selectively reset one of the plurality of column memories based on the column selection signal.

11. The image sensor of claim 10, wherein the reset logic circuit includes:

a first multiplexer configured to receive a plurality of column selection signals;

a flip-flop configured to generate a reset signal based on a column selection signal selectively received from the first multiplexer; and a second multiplexer configured to provide the reset signal to one of the plurality of column memories.

12. The image sensor of claim 11, wherein the test circuit is configured to control signal selection operations of the first multiplexer and the second multiplexer based on an output order of the counter test result values of each of the plurality of column memories.

13. The image sensor of claim 11, wherein the test circuit is configured to reset the flip-flop after providing the reset signal to one of the plurality of column memories via the second multiplexer.

14. The image sensor of claim 9, wherein the test circuit is configured to control the at least one counter to generate a plurality of counter test results by providing a first count clock signal to the at least one counter corresponding to even columns from among the plurality of columns, and generate a plurality of counter test results by providing a second count clock signal to the at least one counter corresponding to odd columns from among the plurality of columns.

15. The image sensor of claim 9, wherein the output buffer is configured to output the counter test result stored in the column memory corresponding to the column selection signal when the column selection signal is at a first level, and reset the column memory corresponding to the column selection signal at timing at which the column selection signal transits from the first level to a second level.

16. An image sensor comprising:

a plurality of pixels;

a row decoder configured to generate a row selection signal and a pixel reset signal, and provide the row selection signal and the pixel reset signal to the plurality of pixels;

a sampler configured to sample a reference signal and an image signal provided to a plurality of column lines that are connected to the plurality of pixels, and to output the reference signal and the image signal as a sampling signal;

an analog-to-digital converter (ADC) configured to generate image data based on the sampling signal, and including one or more counters;

an output buffer configured to temporarily store the image data, and output the image data; and a test circuit configured to receive a test code, and test the one or more counters based on the test code.

17. The image sensor of claim 16, wherein the test circuit tests counting operations of the one or more counters, and the one or more counters generate test results and provide the test results to the output buffer.

18. The image sensor of claim 17, wherein the output buffer includes:

a plurality of memories configured to store the test results, and a reset logic circuit configured to reset the plurality of
memories depending on whether the test results is
output or not.

19. The image sensor of claim 16, further comprising a timing controller configured to provide clock signals and control signals to the row decoder, the ADC and the output buffer.

20. The image sensor of claim 16, wherein the output buffer receives a column selection signal and outputs a counter test result stored in a column memory corresponding to the column selection signal.

* * * * *